(12) United States Patent
Philippou et al.

(10) Patent No.: US 6,385,648 B1
(45) Date of Patent: May 7, 2002

(54) METHOD FOR INITIALIZING A BOX ON A DATA COMMUNICATIONS NETWORK

(75) Inventors: James A. Philippou, Nashua, NH (US); Kerry M. Hannigan, Boston; Gary W. Hoglund, Groton, both of MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/184,522

(22) Filed: Nov. 2, 1998

(51) Int. Cl.[7] .............................................. G06F 13/00
(52) U.S. Cl. ....................................................... 709/222
(58) Field of Search ................................ 370/346, 449; 709/200, 203, 220, 221, 222–223, 224, 227, 228; 710/220

(56) References Cited

U.S. PATENT DOCUMENTS 6,105,100 A * 8/2000 Dean et al. .................. 710/220

OTHER PUBLICATIONS

Droms, R.: "Interoperation Between DHCP and BOOTP", RFC 1534, Bucknell University, Oct. 1993.
Droms, R.: "Dynamic Host Configuration Protocol", RFC 2131, Bucknell University, Mar., 1997.

* cited by examiner

Primary Examiner—Robert B. Harrell
(74) Attorney, Agent, or Firm—Blakely Sokoloff Taylor & Zafman

(57) ABSTRACT

Methods for initializing an uninitialized box in a data communications network. In one embodiment, the Internet protocol (IP) address, subnet mask and default gateway of a network switch or box is remotely initialized over a data communications network from a configuration utility on a host computer. In one embodiment, the configuration utility broadcasts a service announcement over the network indicating that it is available to initialize uninitialized boxes. An uninitialized box on the network replies to the service announcement. In one embodiment, the reply from the uninitialized box includes the serial number of the uninitialized box. In one embodiment, after the configuration utility receives the reply from the uninitialized box, the configuration utility prompts a network administrator to enter an IP address, subnet mask and default gateway to assign to the uninitialized box. In one embodiment, the configuration utility broadcasts an initialization message over network including the serial number of the uninitialized box and the entered IP address, subnet mask and default gateway. In one embodiment, after the uninitialized box receives the initialization message, the uninitialized box acknowledges their receipt indicating that the uninitialized box has been initialized using the entered IP address, subnet mask and default gateway. In one embodiment, the configuration utility then accesses a configuration Web page of the formerly uninitialized box over the network utilizing the assigned IP address to further configure the formerly uninitialized box.

41 Claims, 5 Drawing Sheets

METHOD FOR INITIALIZING A BOX ON A DATA COMMUNICATIONS NETWORK

BACKGROUND OF THE INVENTION

1. Field of the Invention

The present invention relates generally to the field of data communications networks and, more specifically, the present invention relates to the method for initializing data communications network devices.

2. Background Information

Computer networks are used to interconnect many boxes or computing resources, such as for example computers, workstations, servers, printers, modems, storage devices and the like. For example, two or more computers may be connected together through a network. Network users are able to share files, printers and other resources, send messages and run applications on remote computers. An important part of any computer network includes the physical components or network communications devices used to interconnect the computing resources.

To illustrate, FIG. 1 shows a plurality of networks 111, 113 and 115. In computing resources including boxes 101, 103, 105, 107 and 109 are interconnected through network 111. As illustrated in FIG. 1, box 107 links network 111 to network 113 and box 105 links network 111 to network 115. As such, boxes 105 and 107 may be bridges, routers, switches or the like.

Computing resources in a network communicate with one another by using identifiers or addresses in accordance with the particular protocol used by the network. Therefore, when a box is added to a network, the box must be initialized with a network identifier or address so that it will be recognized by and can communicate with other computing resources in the network.

To illustrate, assume for example that network 111 uses the Transmission Control Protocol/Internet Protocol (TCP/IP) suite of communications protocols to interconnect resources on network 111. Accordingly, in order for a box, device, computing resource, etc. to be identified on network 111, each box must have an Internet protocol (IP) address. Networks using the TCP/IP protocol route messages based on the IP address of the destination.

FIG. 1 shows that the IP address 121 of the box 105 is set using a configuration device 117. In some instances, configuration device 117 may be a feature on the back panel of box 105 enabling a network administrator to manually set the IP address 121 of box 105. In other instances, configuration device 117 may be a separate device that is coupled to box 105 using a serial connection 119. FIG. 1 also shows that other configuration parameters of box 105 may be set using configuration device 117. These configuration parameters include subnet mask 123 and default gateway 125.

An inconvenience with the arrangement illustrated in FIG. 1 is that whenever a box or computing resource is added to the network, the network administrator must manually set the network identifier before the box is recognized in the network. As a consequence, in some instances the network administrator must connect configuration device 117 through serial connection 119 to each box that must be initialized. In situations where more than one box is added to the network, the network administrator must separately initialize the network identifier of each box.

SUMMARY OF THE INVENTION

A method of initializing an uninitialized box in network is disclosed. In one embodiment, the method includes the step of broadcasting a service announcement over the network from a configuration utility. The service announcement is used to indicate to the uninitialized box that it may be initialized. After receiving the service announcement, the uninitialized box may transmit an acknowledgement message directed to the configuration utility or the network in response to the service announcement. The acknowledgement message directed to the configuration utility includes a unique identifier of the uninitialized box. Once the acknowledgement is received from the uninitialized box, the configuration utility broadcasts an initialization message over the network to the uninitialized box. The initialization message includes the unique identifier of the uninitialized box and a network identifier that the box can use to be recognized in the network. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Methods for initializing boxes in data communications network are disclosed. The subject of the present invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well-known or conventional details are not described in detail in order to avoid obscuring the present invention.

A portion of the disclosure of this patent and document contains material that is subject to copyright protection. The copyright owner has no objection to the facsimile reproduction by any one of the patent document or patent disclosure, as it appears in the Patent and Trademark Office patent file or records, but otherwise reserves all copyright rights whatsoever. Copyright, © 1998 Bay Networks, Inc.

Figure 1:
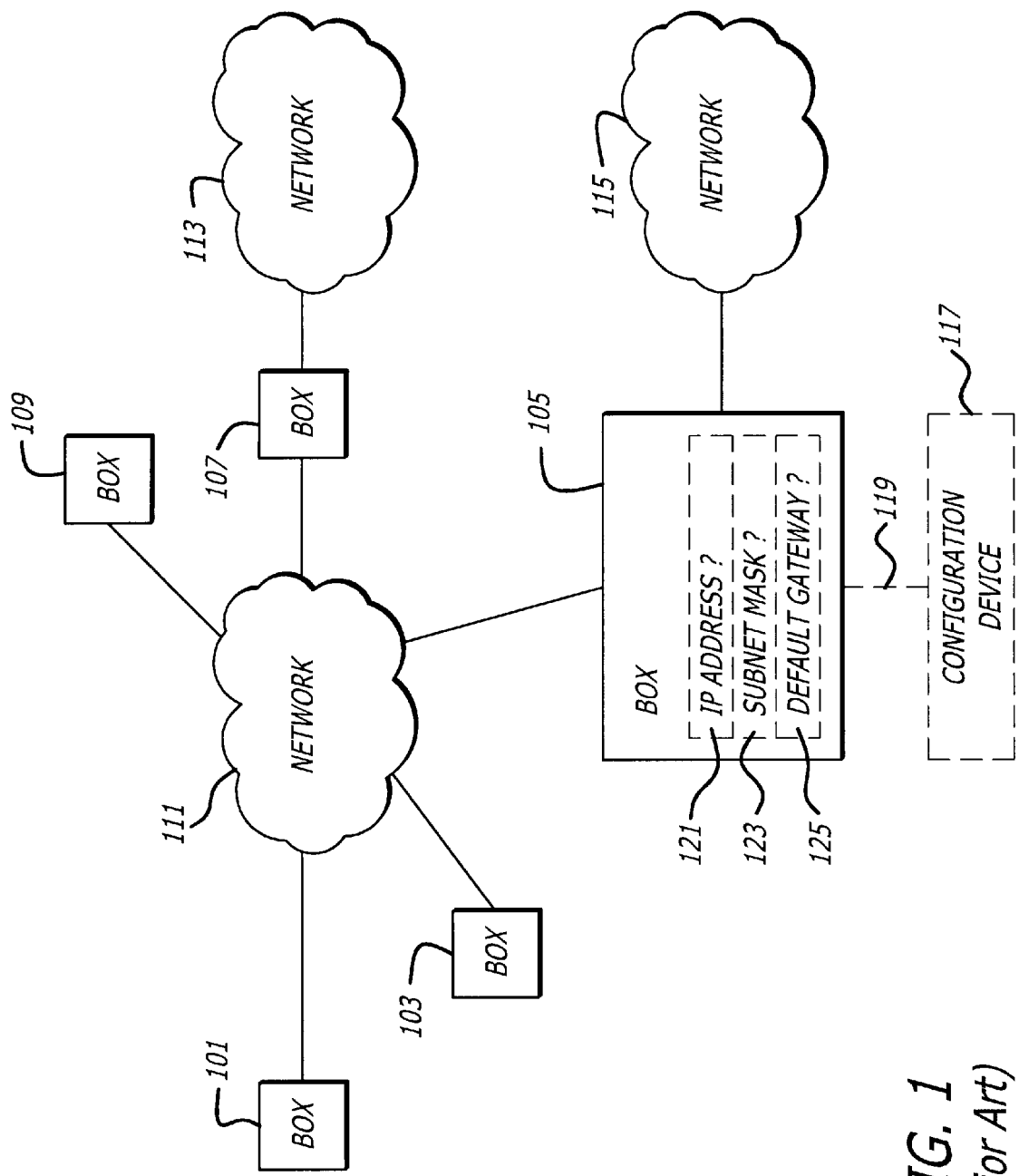
FIG. 1 is an illustration showing a box in a network being configured with a configuration device through a serial connection to set the IP address.
Figure 2:
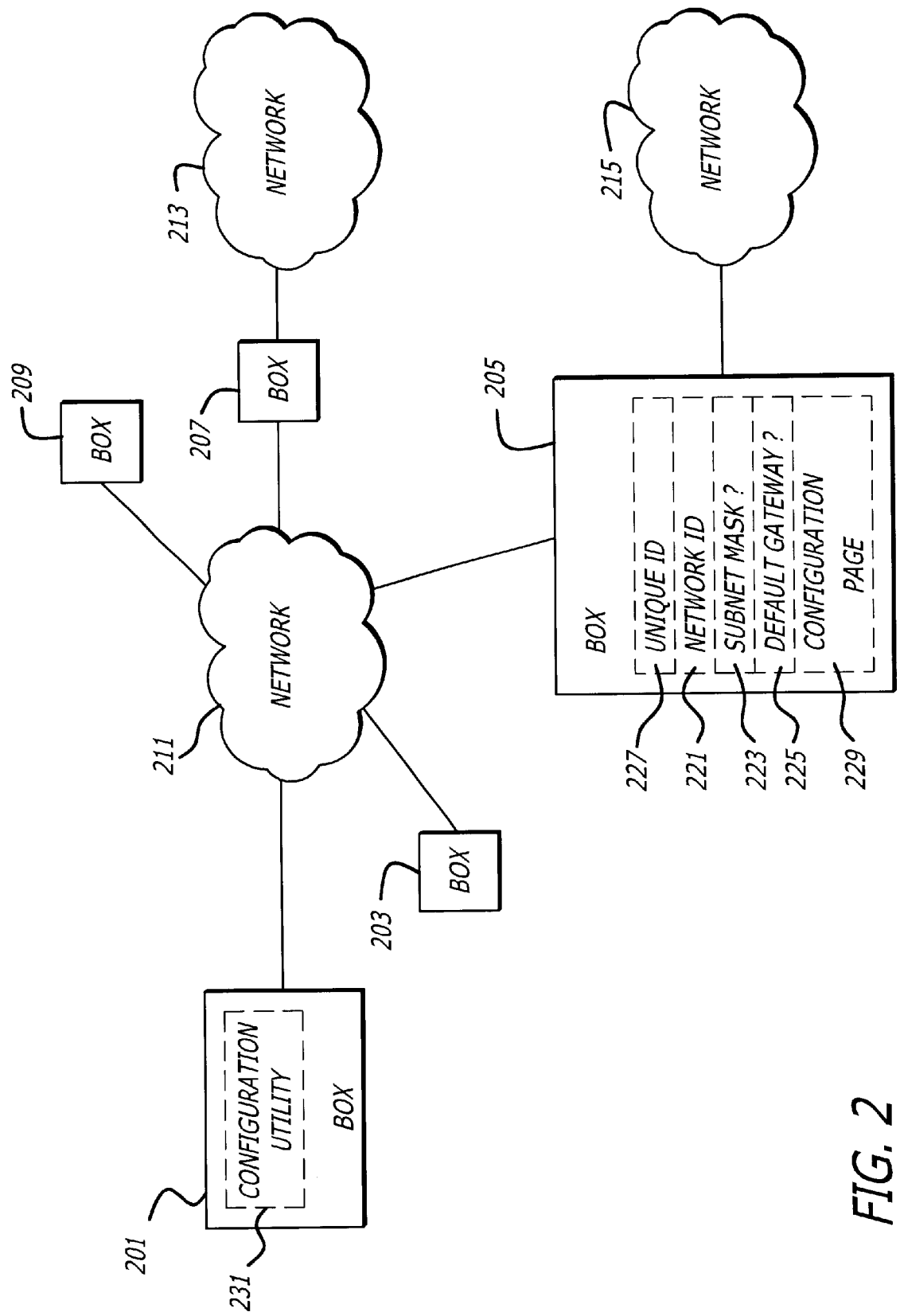
FIG. 2 is an illustration of one embodiment of a box in a network being initialized and configured remotely through the network from a configuration utility in a box coupled to the network in accordance with the teachings of the present invention.

FIG. 2 illustrates a plurality of networks 211, 213 and 215 including boxes 201, 203, 205, 207 and 209 in accordance with teachings of one embodiment of the present invention. It is understood that boxes 201, 203, 205, 207 and 209 represent various computing resources that may be coupled to the network 211 such as for example but not limited to computers, workstations, servers, printers, modems, storage devices, bus, bridges, concentrators, routers, switches or the like. As shown in FIG. 2, boxes 201, 203, 205, 207 and 209 are coupled to network 211. In the embodiment depicted in FIG. 2, boxes 205 and 207 link network 211 to networks 215 and 213, respectively. Thus, in one embodiment, boxes 205 and 207 may be network bridges, routers, switches or the like.

In one embodiment, box 205 is a network switch. In the embodiment illustrated in FIG. 2, box 205 is recognized in network 211 using network identifier 221. In an embodiment where TCP/IP communications protocols are used for communications within network 211, network identifier 221 includes an IP address. As also depicted in the embodiment illustrated in FIG. 2, box 205 also includes a subnet mask 223 and a default gateway 225, which are utilized for network communications. In addition to network identifier 221, box 225 also includes a unique identifier 227. In one embodiment, unique identifier 227 includes a serial number of box 205.

In one embodiment, box 205 also includes a configuration feature, which is accessed to configure various configuration settings of box 205. In one embodiment, the configuration feature of box 205 is a configuration page 229, which in one embodiment is a hypertext markup language (HTML) formatted document or "web page" that may be remotely accessed through network 211 using the network identifier 221 to configure various settings of box 205 once the network identifier 221, subnet mask 223 and default gateway 225 have been initialized.

In one embodiment, the network identifier 221, subnet mask 223, and default gateway 225 may be initialized remotely over network 211 from another box, such as for example box 201. In one embodiment, box 201 includes a configuration utility 231 that may be used to initialize the network identifier 221, subnet mask 223 and default gateway 225. In one embodiment, boxes 201 and 205 include hardware, software or firmware elements to perform initialization functions in accordance with the teachings of the present invention. In one embodiment, box 201 includes a computing system configured to perform the operations of configuration utility 231 in accordance with the teachings of the present invention.

Figure 3:
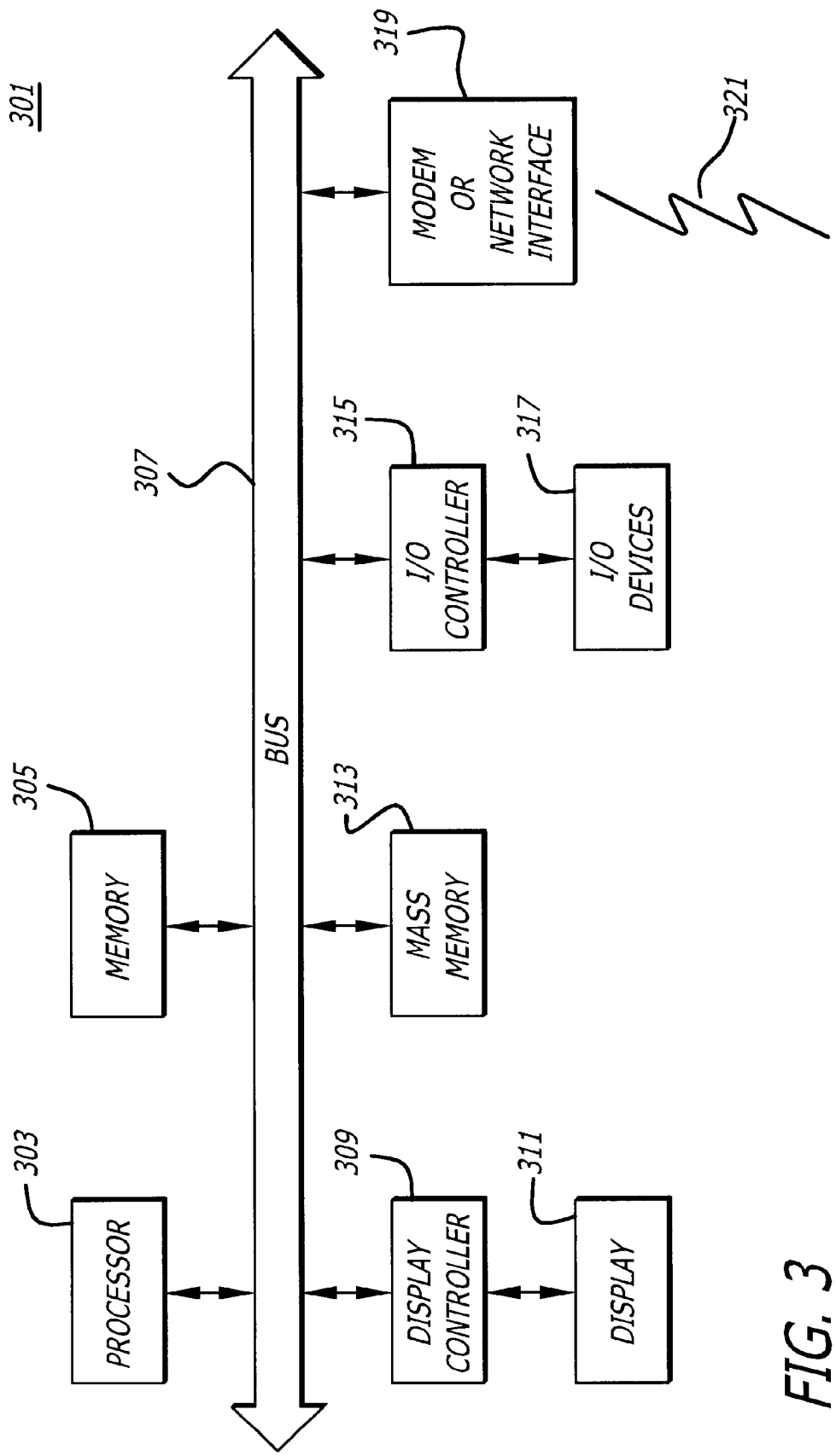
FIG. 3 is a block diagram illustrating the elements of one embodiment of a computing system in accordance with teachings of the present invention.

FIG. 3 shows one embodiment of a conventional computer system 301 that may be included in the box 201 of FIG. 2. It will also be appreciated that a computer system 301 may be used to perform many of the functions other boxes 203, 205, 207 and 209 in accordance with the teachings of the present invention. The computer system 301 interfaces to external systems or boxes through the modem or network interface 319. Although modems and network interfaces are at times considered by some to be separate from connected computer systems, it will be appreciated that the modem or network interface 319 may be considered in some instances to be part of computer system 301. This modem or network interface 319 may be an analog modem, ISDN modem, cable modem, DSL modem, token ring interface, Ethernet interface, satellite transmission interface, or other interfaces for coupling a computer system or box to other computer systems or boxes. As also shown in FIG. 3, a carrier wave signal 321 is received/transmitted by modem or network interface 321 for communications with computer system 301.

In the embodiment illustrated in FIG. 3, computer system 301 includes a processor 303, which may be a conventional microprocessor such as for example an Intel x86 or Pentium family microprocessor, a Motorola 68K or PowerPC family microprocessor, or the like. Memory 305 is coupled to processor 303 by a bus 307. Memory 305 may be dynamic random access memory (DRAM) and may include static random access memory (SRAM). Bus 307 couples processor 303 to memory 305 and also to mass memory 313 and to display controller 309 and the I/O (input/output) controller 315.

Mass memory 313 is often a magnetic hard disk, an optical disk, or another form of storage for large amounts of data. Some of this data may be written by a direct memory access process into memory 305 during execution of software and computer system 301. It is appreciated that software may also be transmitted or received via modem or network interface 319. For purposes of this specification, the term "computer readable medium" shall be taken to include any medium that is capable of storing or encoding a sequence of instructions for execution by a processor and causes the processor to perform the methodologies of the present invention. The term "computer readable medium" shall be taken to include, but not be limited to solid-state memories, optical and magnetic disks, carrier wave signals, or the like.

It will be appreciated that computer system 301 is merely one example of many possible computer systems that have different architectures. For example, WINTEL systems, systems that include Intel microprocessors running the Microsoft Windows operating system, often have multiple buses, one of which may be considered a peripheral bus. Networked computers may also be considered to be a computer system that may be used with the present invention. Network computers may not include a hard disk or other mass memory 313, and the executable programs are loaded from a network connection into memory 305 for execution by processor 303. A typical computer system will usually include at least processor 303, memory 305 and a bus 307 for coupling memory 305 to processor 303.

It will also be appreciated that computer system 301 is controlled by operating system software that includes a file management system, such as a disk operating system, which is part of the operating system software. One example of an operating system software with its associated file management system software is the operating system known as Windows from Microsoft Corporation of Redmond Washington, and its associated file management system, including Windows Explorer. The file management system is typically stored in the mass memory 313 and causes processor 303 to execute the various steps required by the operating system to input and output data and to access data in memory, including accessing files in mass memory 313.

Referring back to FIG. 2, before box 205 is recognized in network 211, the network identifier 221 is initialized in accordance with the teachings of the present invention. In one embodiment, subnet mask 223 and default gateway 225 are also initialized when network identifier 221 is initialized. In one embodiment, configuration utility 201 is utilized to initialize network identifier 221, subnet mask 223 and default gateway 225 remotely over network 211. In one embodiment, configuration utility 201 accesses configuration page 229 to configure other various configuration settings of box 205 after network identifier 221, subnet mask 223 and default gateway 225 have been initialized in accordance with the teachings of the present invention.

Initialization of box 205 in accordance with the teachings of one embodiment of the present invention is as follows. In an embodiment where configuration utility 231 is operating on a computer system of box 201, a window is opened in the display 311 indicating that configuration utility 231 is searching for boxes to initialize. During this time, a service announcement message is broadcast over network 211 to indicate that configuration utility 231 is ready to initialize an uninitialized box coupled to the network 211. In the embodiment where the TCP/IP protocol is used, configuration utility 231 will provide IP addresses to uninitialized boxes.

In the example described above, it is assumed that box 205 is an uninitialized box for illustration purposes. Thus, after the above described service announcement message is received, box 205 replies with an acknowledgement message addressed directly to configuration utility 231 of box 201 to indicate that box 205 is ready to be initialized and receive a network identifier 221. In the acknowledgement message directed to configuration utility 231, box 205 includes the unique identifier 227 of box 205. In one embodiment, the unique identifier 227 includes the serial number of box 225. In an embodiment where TCP/IP is a communications protocol used in network 211, the acknowledgement message also contains an arbitrary predetermined source IP address and the rest of the fields of the acknowledgement message are zeroed.

Figure 4:
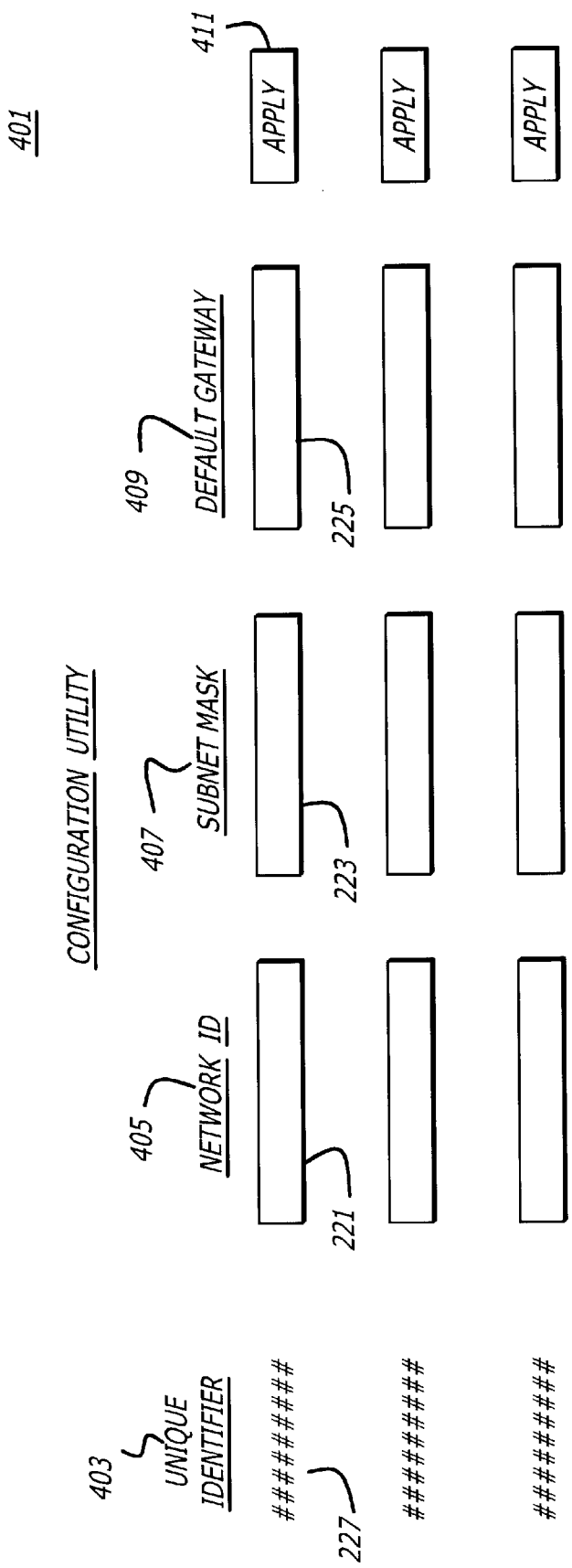
FIG. 4 is an illustration of one embodiment of a display screen of a configuration utility in accordance with the teachings of the present invention.

In one embodiment, after configuration utility 231 receives the directed acknowledgement from box 205, a list of all the boxes found is displayed on the display 311. An example of one embodiment of a screen 401 listing all of the boxes found is illustrated in FIG. 4. As shown in FIG. 4, one embodiment of screen 401 includes a column 403 of the found unique identifiers or serial numbers of boxes that acknowledged the service announcement. In one embodiment, screen 401 also includes three additional columns 405, 407 and 409. In these columns, configuration utility 231 prompts for a network identifier, or an IP address in the case of a TCP/IP network, a subnet mask and default gateway.

In the embodiment illustrated in FIG. 4, it is shown that box 205 was found by configuration utility 231 as the unique identifier 227 of box 205 is listed in column 403. Columns 405, 407 and 409 prompt a user or network administrator to enter values for a network identifier 221, subnet mask 223 and default gateway 225. In one embodiment, after values for the network identifier 221, subnet mask 223 and default gateway 225 are entered, the network administrator can click on "Apply" button 411 to assign the values entered in screen 401 to box 205.

Thus, in one embodiment after the values for network identifier 221, subnet mask 223 and default gateway 225 are received by configuration utility 231, an initialization message is broadcast by configuration utility 231 over network 211 including the entered values. Although the initialization message is broadcast over the network, the initialization message includes the unique identifier 227 of box 205. Therefore, it will be known to box 205 that when the initialization message is received, the network identifier 221, subnet mask 223 and default gateway 225 included in the initialization message are intended for box 205.

In one embodiment, after box 205 receives the initialization message broadcast from configuration utility 231, box 205 updates its values for network identifier 221, subnet mask 223 and default gateway 225. Once these values of box 205 have been updated, one embodiment of box 205 sends a second acknowledgement directed to configuration utility 231 over network 211 to indicate that its network identifier 221, subnet mask 223 and default gateway 225 settings have been initialized.

In one embodiment, after configuration utility 231 receives the second acknowledgement from box 205, the configuration feature of box 205 is accessed from configuration utility 231. In an embodiment where network 211 utilizes the TCP/IP protocol, network identifier 221 is an IP address and the configuration feature of box 205 is an HTML formatted configuration page 229, configuration utility launches a browser application with a uniform resource locator (URL) set to "http://<IP address>."

Figure 5:
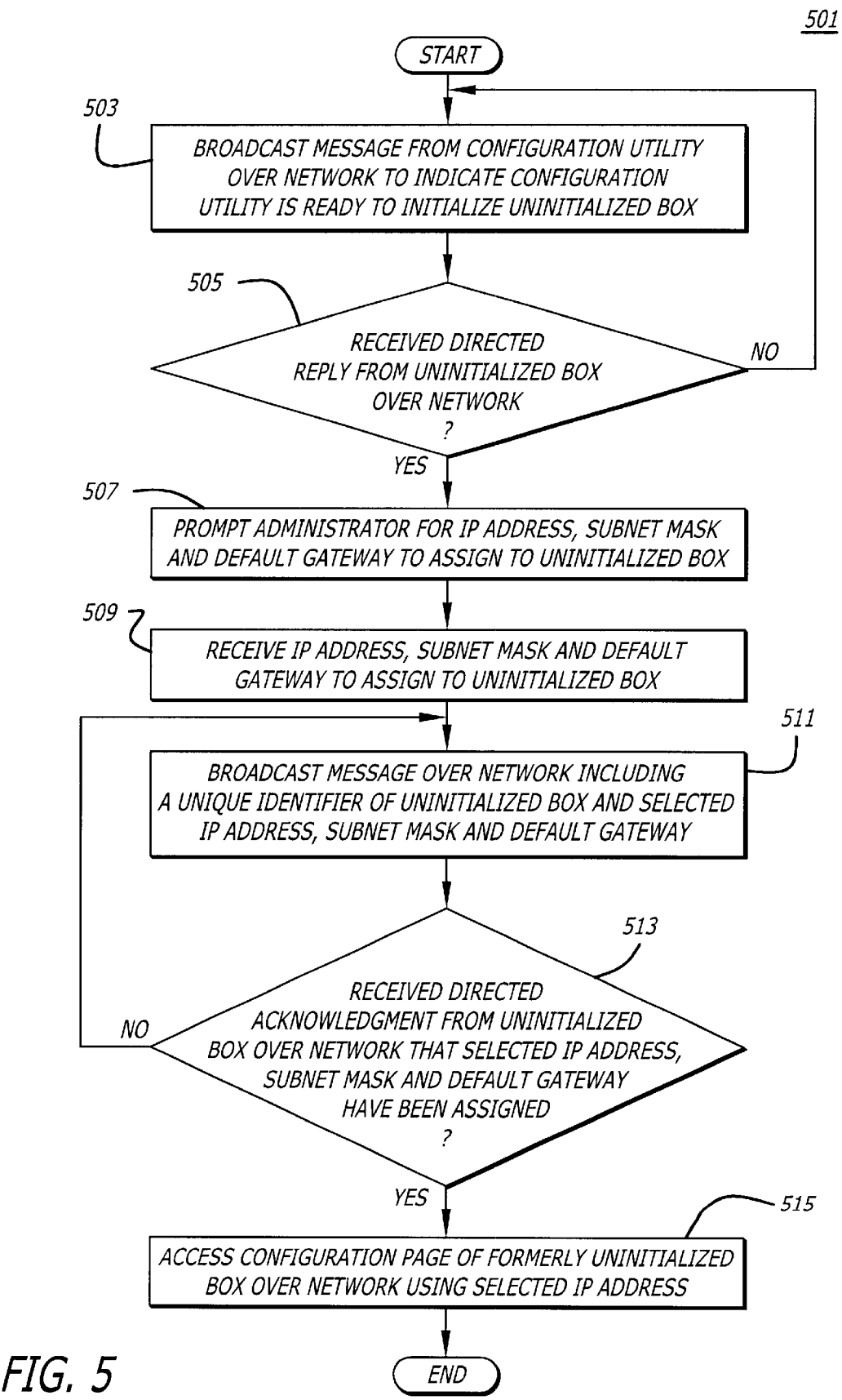
FIG. 5 is a flow diagram illustrating steps performed in accordance with one embodiment of the present invention.

FIG. 5 is a flow diagram 501 illustrating in graphical form steps performed in accordance with the teachings of one embodiment of the present invention. In the embodiment described in FIG. 5, it is assumed that a network utilizing TCP/IP communications is utilized and that an IP address will be assigned to an uninitialized box in accordance with teachings of the present invention. It will be appreciated that networks having other communications protocols may be utilized in accordance with the teachings of the present invention.

As shown in FIG. 5, processing 503 shows that a message is broadcast from the configuration utility over the network to indicate that the configuration utility is ready to initialize an uninitialized box. This message is utilized by the configuration utility to announce the availability of service over the network. In one embodiment, the source IP address of the host computing system of the configuration utility is included in the broadcast message.

Afterwards, in one embodiment, decision 505 determines whether any reply is received from an uninitialized box over the network directed to the host computing system by using the source IP address that was included in the broadcast message. If not, processing loops back to processing 503. In one embodiment, the configuration utility re-broadcasts the service announcement message every 15 seconds until the configuration utility receives a directed reply from an uninitialized box in accordance with the teachings of the present invention.

Once a directed to reply is received in decision 505, processing 507 shows that the network administrator is prompted to enter an IP address, subnet mask and default gateway to assign to the uninitialized box. In one embodiment, the uninitialized box is identified using the serial number of the uninitialized box that was included in the directed reply. It is noted that in one embodiment, the source IP address of the directed reply is set to a predetermined arbitrary IP address, such as for example 0.0.0.0, since at this time no IP address has yet been set for the uninitialized box. In one embodiment, the uninitialized box retransmits the directed reply every 15 seconds until the configuration utility receives the initialization message from the uninitialized box.

Processing 509 shows that the configuration utility receives an IP address, subnet mask and default gateway to assign to the uninitialized box. In one embodiment, the IP address, subnet mask and default gateway are entered by the network administrator.

Processing 511 shows that the initialization message is broadcast over the network from the configuration utility including the IP address, subnet mask and default gateway entered by the network administrator in processing 507 and 509. In one embodiment, the initialization message includes the unique identifier of the uninitialized box so that the uninitialized box will know that the initialization message is intended for the uninitialized box.

Decision 513 shows that the configuration utility determines whether a directed acknowledgement is received from the uninitialized box indicating that the selected IP address, subnet mask and default gateway have been assigned. If not, processing loops back to processing 511 where the initialization message is re-broadcast. In one embodiment, the configuration utility re-broadcasts the initialization message every 15 seconds until the configuration utility receives an acknowledgement from the uninitialized or formerly uninitialized box.

In one embodiment, the source IP address of the directed acknowledgement from the formerly uninitialized box is the assigned IP address received in processing 511. In that embodiment, the destination IP address of the directed acknowledgement is the source IP address of the host computing system of the configuration utility received in processing 503. In one embodiment, the formerly uninitialized box re-broadcasts the directed acknowledgement every 15 seconds until the configuration utility accesses the configuration page of the formerly uninitialized box.

Processing 515 shows that in the configuration utility accesses of the configuration page of the formerly uninitialized box over the network using the selected IP address. In one embodiment, the configuration page of the formerly uninitialized box is accessed by the configuration utility using the default Web browser of the host computing system.

The foregoing description has provided numerous examples of the present invention. It will be appreciated that various modifications and changes may be made thereto without departing from the broader spirit and scope of the invention as set forth in the appended claims.

What is claimed is:

1. A method of initializing an uninitialized box in a network, the method comprising:
   broadcasting a service announcement over the network from a configuration utility, the service announcement to indicate that the uninitialized box may be initialized;
   receiving a first acknowledgement directed to the configuration utility in response to the service announcement from the uninitialized box, the first acknowledgement including an identifier of the uninitialized box; and
   broadcasting an initialization message over the network from the configuration utility, the initialization message including the identifier of the uninitialized box and a network identifier.

2. The method of claim 1 wherein the network identifier includes an Internet protocol (IP) address.

3. The method of claim 2 wherein the initialization message further includes a subnet mask.

4. The method of claim 3 wherein the initialization message further includes a default gateway.

5. The method of claim 4 further comprising receiving a second acknowledgement directed to the configuration utility from the uninitialized box, the second acknowledgement transmitted by the uninitialized box in response to the initialization message.

6. The method of claim 5 further comprising accessing a configuration feature of the uninitialized box over the network from the configuration utility using the IP address.

7. The method of claim 6 further comprising configuring the uninitialized box over the network with the configuration utility of the uninitialized box.

8. The method of claim 4 further comprising prompting for the default gateway to be included in the initialization message.

9. The method of claim 8 further comprising receiving the default gateway to be included in the initialization message.

10. The method of claim 3 further comprising prompting for the subnet mask to be included in the initialization message.

11. The method of claim 10 further comprising receiving a subnet mask to be included in the initialization message.

12. The method of claim 1 further comprising prompting for the network identifier to be included in the initialization message.

13. The method of claim 12 further comprising receiving the network identifier to be included in the initialization message.

14. A method of initializing an uninitialized box in a network, the method comprising:
   receiving a service announcement broadcasted over the network from a configuration utility;
   transmitting a first acknowledgement in response to the service announcement directed to the configuration utility from the uninitialized box, the first acknowledgement including an identifier of the uninitialized box; and
   receiving an initialization message broadcasted over the network from the configuration utility, the initialization message including the identifier and a network identifier.

15. The method of claim 14 wherein the initialization message further includes a subnet mask.

16. The method of claim 15 further comprising assigning the subnet mask to the uninitialized box.

17. The method of claim 16 further comprising transmitting a second acknowledgement in response to the initialization message directed to the configuration utility from the uninitialized box, the second acknowledgement indicating that the network identifier and subnet mask have been assigned to the uninitialized box.

18. The method of claim 14 wherein the initialization message further includes a default gateway.

19. The method of claim 18 further comprising assigning the default gateway to the uninitialized box.

20. The method of claim 19 further comprising transmitting a second acknowledgement in response to the initialization message directed to the configuration utility from the uninitialized box, the second acknowledgement indicating that the network identifier and the default gateway have been assigned to the uninitialized box.

21. The method of claim 14 further comprising receiving an access request to a configuration feature of the uninitialized box, the access request directed to the uninitialized box using the network identifier.

22. The method of claim 21 further comprising configuring the uninitialized box with the configuration feature.

23. The method of claim 14 wherein the network identifier includes an Internet protocol (IP) address.

24. The method of claim 14 further comprising assigning the network identifier to the uninitialized box.

25. The method of claim 14 further comprising transmitting a second acknowledgement in response to the initialization message directed to the configuration utility from the uninitialized box, the second acknowledgement indicating that the network identifier has been assigned to the uninitialized box.

26. A computer readable medium having sequences of instructions stored therein, which when executed cause a processor to (i) broadcast a service announcement over a network to an uninitialized box in the network from a configuration utility, the service announcement to indicate that the uninitialized box may be initialized, (ii) receive a first acknowledgement directed to the configuration utility from the uninitialized box in response to the service announcement, the first acknowledgement including an identifier of the uninitialized box, and broadcast an initialization message over the network from the configuration utility, the initialization message including the identifier of the uninitialized box and a network identifier.

27. The computer readable medium of claim 26 wherein the initialization message further includes a subnet mask.

28. The computer readable medium of claim 27 wherein the initialization message further includes a default gateway.

29. The computer readable medium of claim 28 wherein the sequence of instructions, when executed, cause the processor to receive a second acknowledgement directed to the configuration utility from the uninitialized box, the second acknowledgement transmitted by the uninitialized box in response to the initialization message.

30. The computer readable medium of claim 29 wherein the sequence of instructions, when executed, cause the processor to access a configuration feature of the uninitialized box over the network from the configuration utility using the network identifier.

31. The computer readable medium of claim 30 wherein the configuration feature of the uninitialized box includes a hypertext markup language (HTML) formatted document.

32. The computer readable medium of claim 30 wherein the sequence of instructions, when executed, cause the processor to configure the uninitialized box with the configuration feature.

33. The computer readable medium of claim 28 wherein the sequence of instructions, when executed, cause the processor to prompt for the default gateway to be included in the initialization message, the prompting step to be performed before the step of broadcasting the initialization message over the network.

34. The computer readable medium of claim 33 wherein the wherein the sequence of instructions, when executed, cause the processor to receive the default gateway to be included in the initialization message, the receiving step to be performed before the step of broadcasting the initialization message over the network.

35. The computer readable medium of claim 27 wherein the sequence of instructions, when executed, cause the processor to prompt for the subnet mask to be included in the initialization message, the prompting step to be performed before the step of broadcasting the initialization message over the network.

36. The computer readable medium of claim 35 wherein the sequence of instructions, when executed, cause the processor to receive the subnet mask to be included in the initialization message, the receiving step to be performed before the step of broadcasting the initialization message over the network.

37. The computer readable medium of claim 26 wherein the sequence of instructions, when executed, cause the processor to prompt for the network identifier to be included in the initialization message, the prompting step to be performed before the step of broadcasting the initialization message over the network.

38. The computer readable medium of claim 37 wherein the sequence of instructions, when executed, cause the processor to receive the network identifier to be included in the initialization message, the receiving step to be performed before the step of broadcasting the initialization message over the network.

39. The computer readable medium of claim 26 wherein the network identifier includes an Internet protocol (IP) address.

40. The computer readable medium of claim 26 when the uninitialized box is a network switch.

41. A computer comprising:

a processor; and a memory accessible by the processor, the memory including a configuration utility, executable by the processor, to broadcast a service announcement message and broadcast an initialization message, including an identifier of a network switch in response to an acknowledgement from the network switch.

* * * * *

UNITED STATES PATENT AND TRADEMARK OFFICE
CERTIFICATE OF CORRECTION

PATENT NO. : 6,385,648 B1
DATED : May 7, 2002
INVENTOR(S) : Philippou et al.

It is certified that error appears in the above-identified patent and that said Letters Patent is hereby corrected as shown below:

<u>Title page,</u>
Item [54], Title, please delete "METHOD" and insert -- METHODS --.

Signed and Sealed this

Twenty-fifth Day of February, 2003

JAMES E. ROGAN
*Director of the United States Patent and Trademark Office*